No. 610,638. Patented Sept. 13, 1898.
J. H. WILLIAMS.
BOLT.
(Application filed Mar. 25, 1898.)
(No Model.) 2 Sheets—Sheet 1.
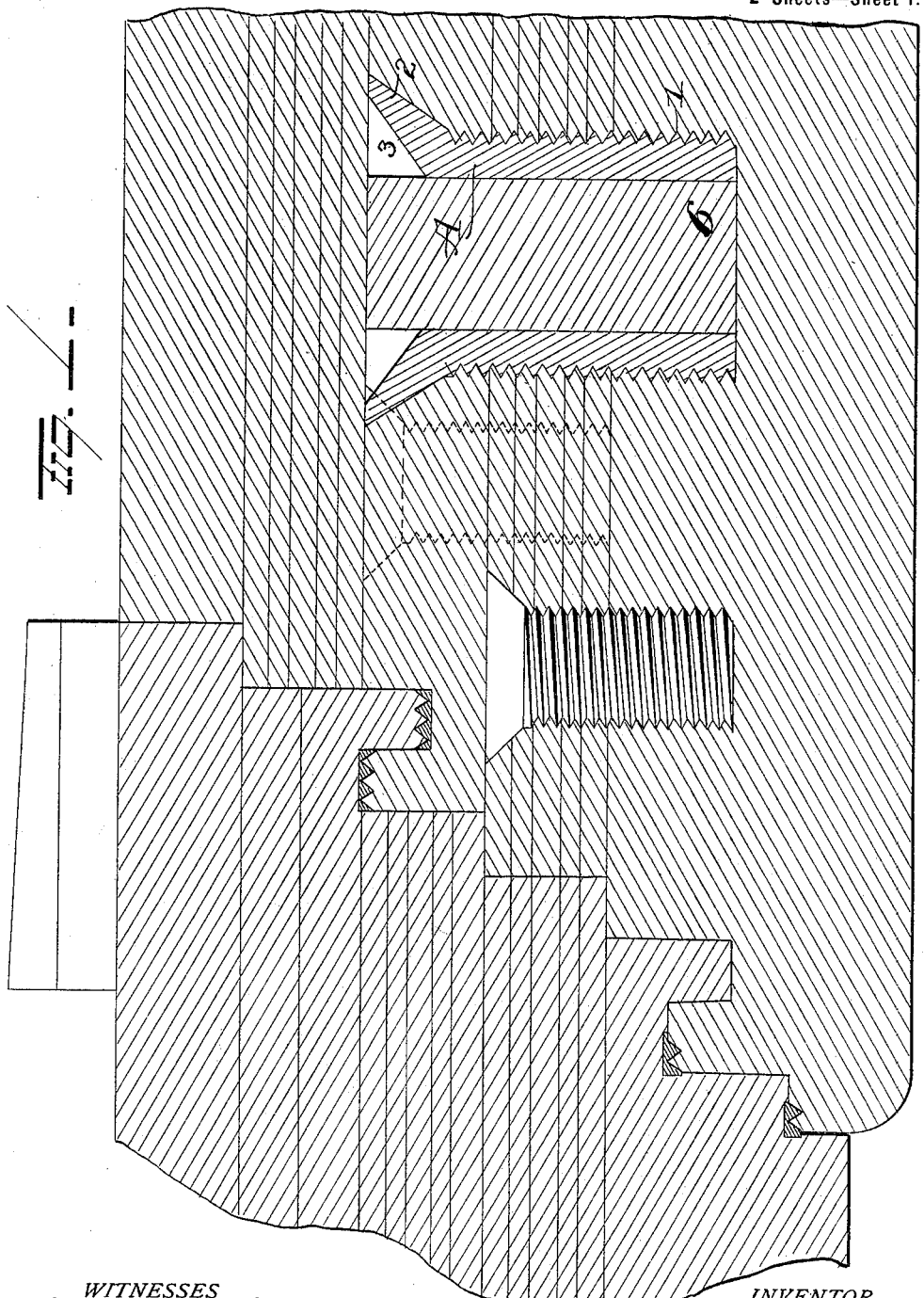
WITNESSES
E. J. Nottingham
G. F. Downing
INVENTOR
J. H. Williams
By H. A. Seymour
Attorney No. 610,638. Patented Sept. 13, 1898.
J. H. WILLIAMS.
BOLT.
(Application filed Mar. 25, 1898.)
(No Model.) 2 Sheets—Sheet 2.
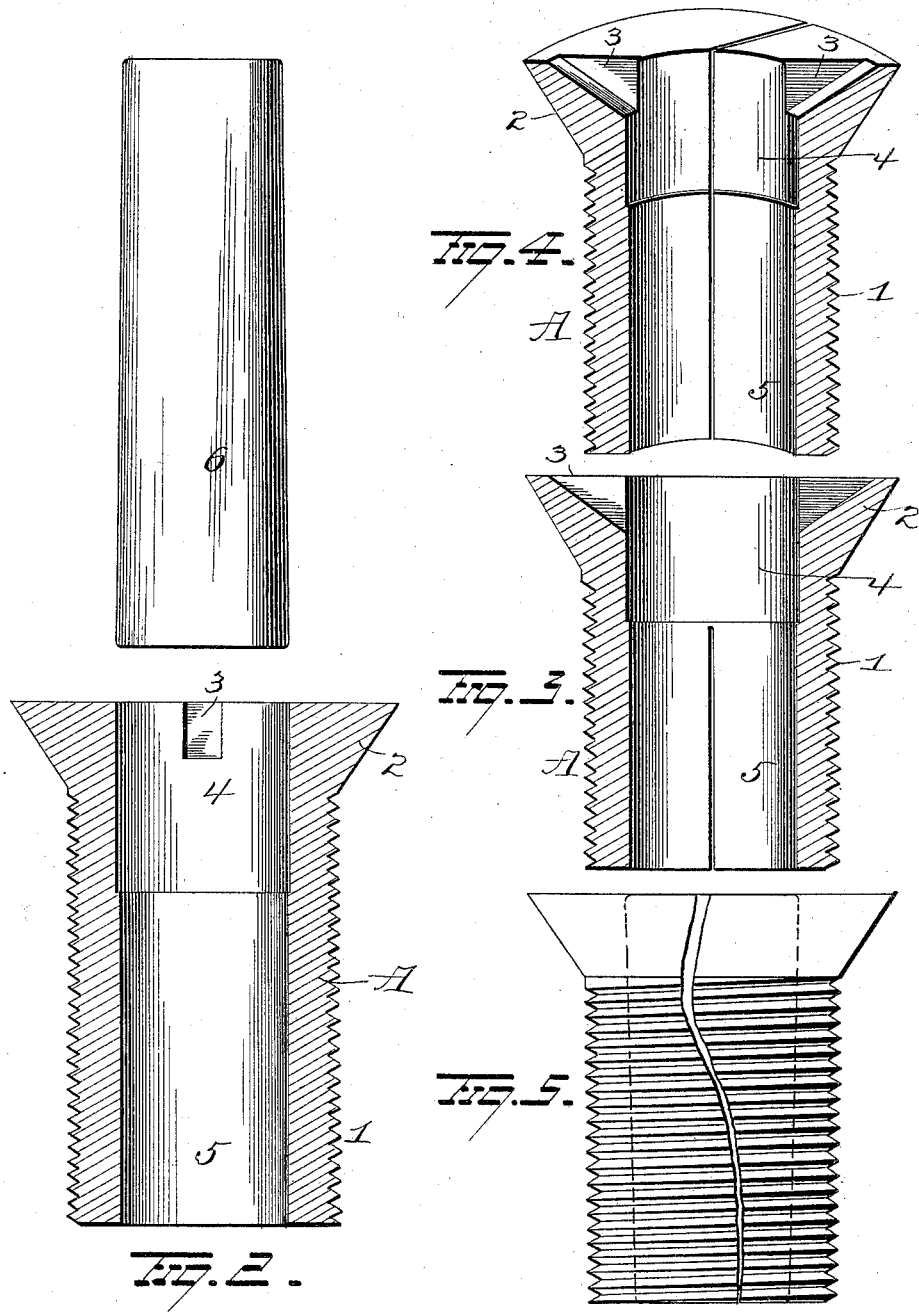

UNITED STATES PATENT OFFICE.

JAMES HENRY WILLIAMS, OF PHILADELPHIA, PENNSYLVANIA, ASSIGNOR TO THE REMINGTON & SHERMAN COMPANY, OF SAME PLACE.

BOLT.

SPECIFICATION forming part of Letters Patent No. 610,638, dated September 13, 1898.

Application filed March 25, 1898. Serial No. 675,150. (No model.)

*To all whom it may concern:*

Be it known that I, JAMES HENRY WILLIAMS, of Philadelphia, in the county of Philadelphia and State of Pennsylvania, have invented certain new and useful Improvements in Bolts; and I do hereby declare the following to be a full, clear, and exact description of the invention, such as will enable others skilled in the art to which it appertains to make and use the same.

My invention relates to an improvement in bolts, the object being to provide one especially constructed for use in securing together the plates which constitute the doors principally or the body portion of a safe or vault and for attaching the vestibules to the main body portion of the safe or vault.

A further object is to provide means for expanding the bolt, so that it fills the hole tightly and makes the bolt and plates to all intents and purposes one integral piece; and it consists in certain novel features of construction and combinations of parts, which will be hereinafter described, and pointed out in the claims.

In the accompanying drawings, Figure 1 is a cross-section showing the bolt in position holding two plates together. Fig. 2 is a detached view. Figs. 3 and 4 are views of modifications; and Fig. 5 is a view of a bolt as heretofore constructed, illustrating the appearance of the fracture formed in a bolt.

A represents the bolt shown in Fig. 2. It is made of tough metal in the general form of a screw, with a threaded exterior 1, a head 2 at one end, and notches 3 3 in the head for the reception of an instrument for turning the bolt. The bolt is bored out longitudinally, as at 4 and 5, on two parallel bores of slightly different diameter, the smaller bore being at the inner end. This portion of the bolt is made in the form of a solid shell; but its threaded shank may be split by a single radial saw-kerf, as shown in Fig. 3, extending inward to or nearly to the head, or a tangential longitudinal kerf might be made entirely through the wall of the bolt, head and all, as shown in Fig. 4. After the bolt is screwed in as tightly as may be through two or three, say, one-inch plates a tapering plug 6 is driven tightly into the bore until the latter is expanded to an approximately uniform cylinder filled from end to end, as shown in Fig. 1. The bolt is expanded at its inner end particularly, the enlarged end of the plug engaging the smaller bore at this point. The plug 6 is made of steel and is hardened at the larger end and graduated in temper until it becomes soft at the smaller end. As the driving is all upon the smaller end of the plug, the latter becomes upset at that end, so that it completely fills the larger bore, and the result is a perfect bolt-lock which is expanded to such an extent that the threads of the bolt conform to and fill the threads of the hole which the bolt enters, resulting to all intents and purposes in the integrity of the plates, bolt, and plug, or at any rate in a union so intimate and secure that the removal of the bolt by any turning instrument is absolutely precluded. It will be observed that the expansion is at the inner end of the bolt or on that portion where the maximum strain would be felt in any attempt to strip the plates apart, this expanded portion holding fast in one plate, with the head resisting any tendency to pull through the other plate. With prior constructions of which I am aware the greatest expansion was at or near the opposite end or the end having the head thereon, the result being that the bolt was ruptured, as shown in Fig. 5, when the wedge was driven in smaller end first. Such a construction was manifestly weak, because there was practically no expansion in the plate in which the point of the bolt entered, and at that end it was substantially as loose after the entrance of the plug as when the bolt was first screwed into its hole. The defect in this shows the obvious advantage derived when the location of the expanded end is reversed. The plugs being of very hard steel, it is impossible to drill through them from the outside even if a drill should happen to strike one of them, and the head is also concealed and protected by a plate on the inside over them.

It is evident that other slight changes might be made in the form and arrangement of the several parts described without departing from the spirit and scope of my invention, and hence I do not wish to limit myself to the exact construction herein set forth; but, Having fully described my invention, what I claim as new, and desire to secure by Letters Patent, is—

1. The combination of a hollow bolt having a uniform external diameter below its head and having an internal diameter greater at the headed end than at the other end thereof, and a tapering plug smaller than the internal diameter of said headed end adapted to be driven into the bore of the bolt so that its larger end will terminate in the portion of the bore having the smaller diameter, whereby the bolt will be expanded beyond the head without subjecting the headed end of the bolt to undue strain, substantially as set forth.

2. The combination of a hollow bolt having a uniform external diameter and having a cylindrical bore of two different diameters and a tapering plug, the larger end of which is forced into the portion of the bore having the lesser diameter, substantially as set forth.

3. A bolt having a bore formed in two sizes, the one toward the point of the bolt being of the lesser diameter, in combination with a tapering plug the larger end of which enters the smaller diameter and causes the bolt to expand at that point and the smaller end upset to fill the larger bore at the outer end.

4. A split bolt having a uniform external diameter and a cylindrical bore having two different diameters, in combination with a tapering plug driven into said bore with its larger end terminating in the part of the bore having the smaller diameter, substantially as set forth.

5. A bolt having a bore cut on two different diameters, and split by a tangential kerf extending the entire length of the bolt, in combination with a tapering plug the larger end of which enters and expands the end of the bolt whose bore has the shorter diameter.

6. The combination with two or more plates, of a hollow bolt screwed into two or more of these plates, the bore of said bolt cut on a large and small diameter, and a plug tapering in form the larger end entering and expanding the portion of the bolt having the smaller bore.

In testimony whereof I have signed this specification in the presence of two subscribing witnesses.

JAMES HENRY WILLIAMS.

Witnesses:
CHAS. F. WALTER,
ALBERT E. LOWRY.